United States Patent Office 3,037,013
Patented May 29, 1962

3,037,013
TRISAZO DYESTUFFS
Karl-Heinz Freytag and Klaus Böckmann, Koln-Stammheim, Germany, assignors to Farbenfabriken Bayer Aktiengesellschaft, Leverkusen, Germany, a corporation of Germany
No Drawing. Filed Dec. 14, 1959, Ser. No. 859,120
Claims priority, application Germany Dec. 16, 1958
7 Claims. (Cl. 260—173)

The present invention relates to new and valuable trisazo dyestuffs; more particularly it relates to trisazo dyestuffs of the formula

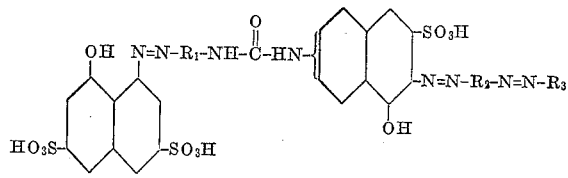

In this formula $R_1$ means a phenylene residue substituted by at least one lower alkyl and/or lower alkoxy radical and carrying the azo- and urea bridge in p-position to each other; $R_2$ means a phenylene radical which is substituted by at least one sulphonic acid, lower alkyl and/or lower alkoxy group and in which the azo bridges stand in p-position to one another; and $R_3$ denotes a phenyl residue which carries at least one sulphonic acid, carboxylic acid and/or hydroxy group.

The new trisazo dyestuffs are obtained by coupling an aminomonoazo compound of the formula

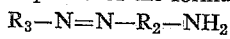
$$R_3-N=N-R_2-NH_2$$

with a mixed urea of the composition

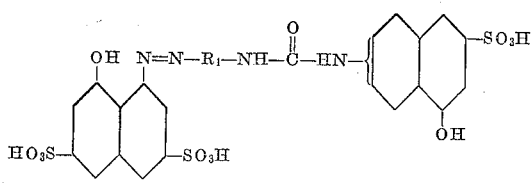

wherein $R_1$, $R_2$ and $R_3$ have the above-mentioned significance, in the o-position to the hydroxy group contained in the right-hand naphthalene radical.

The reaction of the starting components is carried out in an alkaline, preferably aqueous medium, the diazo compound coupling in the o-position to the hydroxyl group of the urea derivative of the γ or J acid (right-hand) coupling component.

The mixed ureas are obtainable, for example, according to the process described in German patent specification No. 871,000. The aminomonoazo dyestuffs are likewise obtainable according to known methods. In the compound of the above formulae there may be used as component $R_1$ inter alia 1-amino-2,5-dimethylbenzene, 1-amino-2-methoxy-5-methylbenzene, 1-amino-2-methoxybenzene or 1-amino-2-methylbenzene; as compound $R_3$ the following compounds may be used, 1-aminobenzene-4-sulphonic acid, 1-aminobenzene-3-sulphonic acid, 1-aminobenzene-2,5-disulphonic acid or 1-amino-4-hydroxybenzene-3-carboxylic acid. Examples of $R_2$ are 1-aminobenzene-2-sulphonic acid, 1-amino-2-methoxy-5-methylbenzene, 1-amino-2,5-dimethoxybenzene or 1-aminobenzene-2,5-dimethylbenzene.

The dyestuffs obtained dye cotton and regenerated cellulose in red-brown, red to dark violet shades of good general fastness properties, but in particular of good fastness to light and of good dischargeability.

The following examples are given for the purpose of illustrating the invention without, however, limiting it thereto.

Example 1

71.8 parts by weight of the mixed urea obtainable from the phenyl urethane of the monoazo dyestuff 1-(4'-amino-3' - methoxy - 6' - methylbenzene-1'-azo)-8-benzene-sulphonyl hydroxy-naphthalene-3,6-disulphonic acid and 2-amino-5-hydroxynaphthalene-7-sulphonic acid, are dissolved neutral in about 700 parts by volume of water and combined at room temperature in a sodium carbonate alkaline medium with 33.7 parts by weight of diazotised 4 - amino-4'-hydroxyazobenzene-3'-carboxylic acid-3-sulphonic acid dissolved in 600 parts by volume of water. The benzene-sulphonic acid ester is saponified at 70–80° C. within 30 minutes with an about 2–3% sodium hydroxide solution. The dyestuff is subsequently separated with common salt in a soda-alkaline medium. It dyes cotton and regenerated cellulose in ruby-red shades, having good general fastness properties.

Example 2

71.8 parts by weight of the mixed urea obtainable from the phenyl urethane of the monoazo dyestuff 1-(4'-amino-2',5' - dimethylbenzene-1'-azo)-8-benzene-sulphonyl-hydroxy-naphthalene-3,6-disulphonic acid and 2-amino-8-hydroxy-naphthalene-6-sulphonic acid, are combined alkaline with 35.7 parts by weight of diazotised 4-aminoazobenzene-3,4'-disulphonic acid. When the coupling is completed, the benzene-sulphonyloxy group is saponified and the dyestuff separated in a soda-alkaline medium. It dyes cotton and regenerated cellulose in red-brown shades with good general fastness properties.

Example 3

71.8 parts by weight of the mixed urea described as coupling component in Example 1 are combined alkaline with 35.7 parts by weight of 4-aminoazobenzene-3,4'-disulphonic acid. After completion of the coupling, the benzene sulphonyloxy group is saponified and the dyestuff separated in a soda-alkaline medium. It dyes cotton and regenerated cellulose in red shades.

Example 4

71.8 parts by weight of the mixed urea described as coupling component in Example 1, are combined alkaline with 32.1 parts by weight of the diazotised aminomonoazo dyestuff prepared by coupling in acid medium diazotised 1-aminobenzene-4-sulphonic acid with 1-amino-2-methoxy-5-methylbenzene. When the coupling is completed, the benzenesulphonyloxy group is saponified and the dyestuff separated in a soda-alkaline medium. It dyes cotton and regenerated cellulose in violet shades.

Example 5

71.8 parts by weight of the mixed urea described as coupling component in Example 1 are combined alkaline with 38.5 parts by weight of the diazotised aminoazo dyestuff obtained by coupling in an acid medium diazotized 1-aminobenzene-2,5-disulphonic acid with 1-amino-2,5-dimethylbenzene. After completion of the coupling, the benzene-sulphonyl group is saponified and the dyestuff separated in a soda-alkaline medium. It dyes cotton and regenerated cellulose in bluish red shades.

Example 6

100 parts by weight of cotton are introduced at room temperature into a dyebath containing, dissolved in 4000 parts of water, 2 parts of weight of the dyestuff according to Example 1, 1 part by weight of sodium carbonate and 20 parts by weight of sodium sulphate. The dyebath is heated to 90° C. within about 30 minutes and kept at 90–95° C. for a further 30 minutes. The dyed cotton is then rinsed and dried. A yellowish red dyeing of very good light fastness is obtained.

We claim:
1. A trisazo dyestuff corresponding to the formula

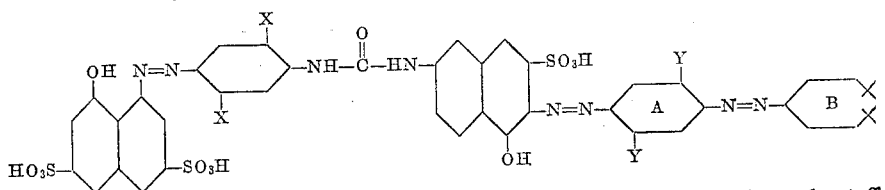

wherein one X is a member selected from the class consisting of lower alkyl and lower alkoxy and the other X stands for a member selected from the group consisting of hydrogen, lower alkyl and lower alkoxy, one Y is a substituent selected from the group consisting of a sulfonic acid group, lower alkyl group and lower alkoxy group, the other Y is a member taken from the class consisting of hydrogen, sulfonic acid group, lower alkyl group and lower alkoxy group, Z means a sulfonic acid group, $Z_1$ stands for a member selected from the class consisting of hydrogen and a sulfonic acid group, and Z and $Z_1$ taken together stand for o-hydroxy-carboxy grouping, the hydroxy group standing in p-position to the azo group and wherein the phenylene residues A and B contain together not more than two water-solubilising groups selected from the class consisting of sulfonic acid and carboxylic acid groups.

2. A trisazo dyestuff of claim 1 wherein one X is lower alkyl and the other X is lower alkoxy, wherein one Y is a sulfonic acid group and the other Y is hydrogen, and wherein one Z is a sulfonic acid group and the other $Z_1$ is hydrogen.

3. A trisazo dyestuff of claim 1 wherein one X is lower alkyl and the other X is lower alkoxy, wherein one Y is a sulfonic acid group and the other Y is hydrogen, and wherein Z stands for a hydroxy group which is in p-position to the azo group and $Z_1$ stands for a carboxylic acid group which is ortho to the hydroxy group.

4. A trisazo dyestuff of claim 1 wherein each Y substituent is a lower alkyl group and wherein Z and $Z_1$ are each sulfonic acid groups.

5. The trisazo dyestuff of the formula

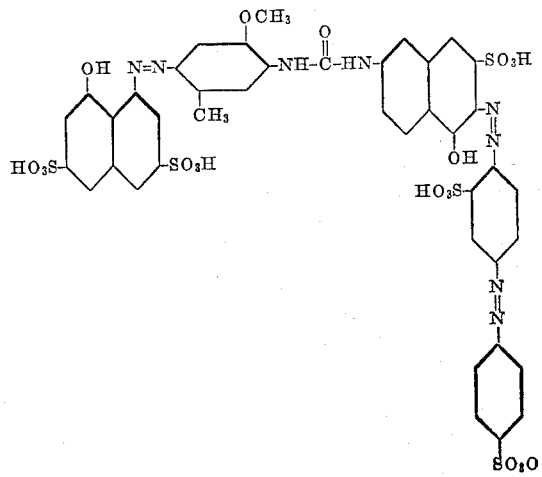

6. The trisazo dyestuff of the formula

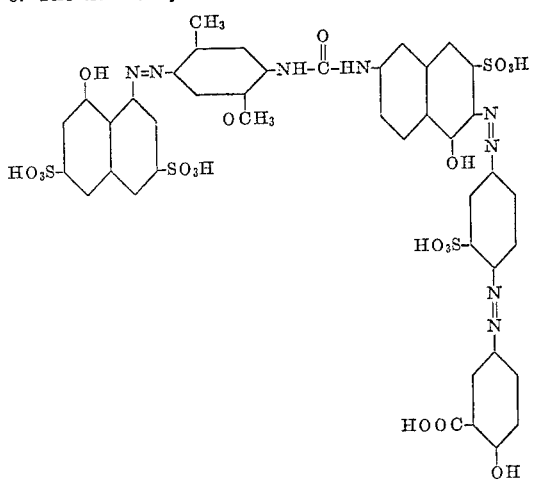

7. The trisazo dyestuff of the formula

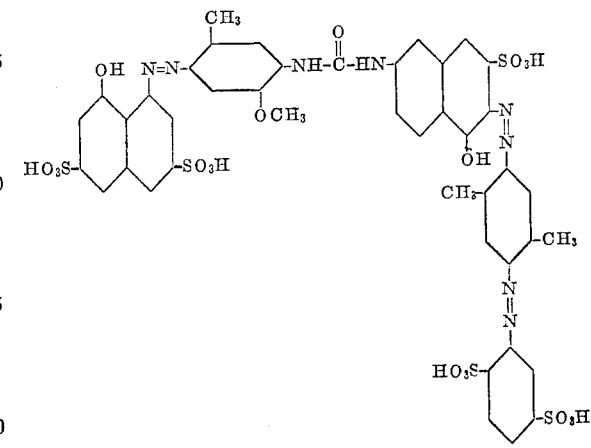

No references cited.

UNITED STATES PATENT OFFICE
CERTIFICATE OF CORRECTION

Patent No. 3,037,013                                    May 29, 1962

Karl-Heinz Freytag et al.

It is hereby certified that error appears in the above numbered patent requiring correction and that the said Letters Patent should read as corrected below.

Columns 3 and 4, lines 3 to 9, the extreme right-hand portion of the formula should appear as shown below instead of as in the patent:

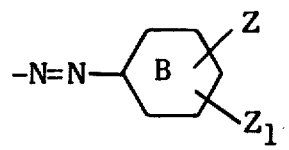

column 3, the lowest portion of the formula in claim 5 should appear as shown below instead of as in the patent:

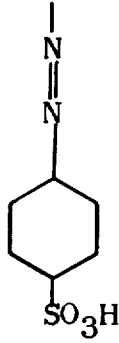

column 4, lines 12 to 31, for that portion of the formula in claim 6 reading

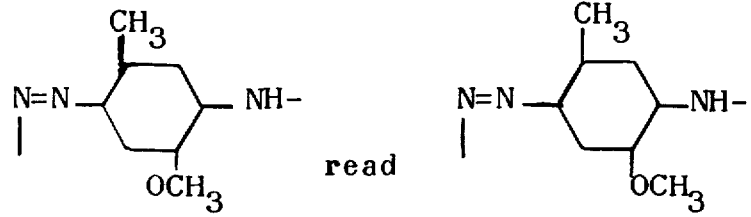

Signed and sealed this 16th day of October 1962.

(SEAL)
Attest:

ERNEST W. SWIDER
Attesting Officer

DAVID L. LADD
Commissioner of Patents